United States Patent
Ylitalo et al.

(10) Patent No.: US 7,136,625 B2
(45) Date of Patent: Nov. 14, 2006

(54) METHOD FOR IMPROVING ACOUSTIC PROPERTIES OF A TERMINAL DEVICE AND A TERMINAL DEVICE

(75) Inventors: Juha Ylitalo, Oulu (FI); Antti-Olli Kauppinen, Oulu (FI)

(73) Assignee: Flextronics ODM Luxembourg S.A., Luxembourg Zweigniederlassung Schweiz, Baar (CH)

( * ) Notice: Subject to any disclaimer, the term of this patent is extended or adjusted under 35 U.S.C. 154(b) by 465 days.

(21) Appl. No.: 10/160,295

(22) Filed: Jun. 4, 2002

(65) Prior Publication Data

US 2002/0187758 A1 Dec. 12, 2002

(30) Foreign Application Priority Data

Jun. 6, 2001 (FI) .................................. 20011193

(51) Int. Cl.
*H04B 1/38* (2006.01)
(52) U.S. Cl. ............. 455/90.3; 455/575.1; 379/433.01; 379/434
(58) Field of Classification Search ............... 455/90.2, 455/90.3, 550.1, 575.1, 575.5, 575.7, 575.8, 455/128, 129, 347, 350; 379/428.01, 433.01, 379/433.1, 434; 343/702, 700 MS, 846, 343/700
See application file for complete search history.

(56) References Cited

U.S. PATENT DOCUMENTS

| | | | | |
|---|---|---|---|---|
| 5,337,346 A | * | 8/1994 | Uchikura | ................. 455/556.2 |
| 5,392,461 A | * | 2/1995 | Yokoyama | ................. 455/90.2 |
| 6,201,501 B1 | * | 3/2001 | Arkko et al. | ............. 455/575.7 |
| 6,411,826 B1 | * | 6/2002 | Camp, Jr. | ................... 455/566 |
| 2003/0096632 A1 | * | 5/2003 | Kim et al. | .................... 455/90 |

FOREIGN PATENT DOCUMENTS

| | |
|---|---|
| DE  44 10 995 A1 | 6/1994 |
| DE  196 40 412 C1 | 1/1998 |
| EP  0 909 077 A2 | 4/1999 |
| EP  0 924 793 A2 | 6/1999 |
| EP  1 184 936 A1 | 3/2002 |
| FR  2 783 652 | 3/2000 |
| WO  WO 00/38475 | 6/2000 |
| WO  WO 02/35810 A1 | 5/2002 |
| WO  WO 02/50944 A1 | 6/2002 |

* cited by examiner

*Primary Examiner*—Quochien B. Vuong
(74) *Attorney, Agent, or Firm*—Arent Fox PLLC

(57) ABSTRACT

The present invention relates to acoustic properties of a terminal device of a telecommunication network. To improve the capability of the terminal device to maintain the sound quality good while the distance between the speaker and the ear changes, the enclosure of the terminal device is provided with means (71, 81) for conveying the acoustic waves generated backwards by the speaker (30) of the device inside the enclosure to a cavity-like antenna space (80) intended for the antenna of the terminal device.

11 Claims, 3 Drawing Sheets

METHOD FOR IMPROVING ACOUSTIC PROPERTIES OF A TERMINAL DEVICE AND A TERMINAL DEVICE

TECHNICAL FIELD OF THE INVENTION

The invention relates to the acoustic properties of a terminal device and particularly to the ones of a subscriber terminal device of a telecommunication system such as a mobile station. More particularly, the objective of the invention is to improve the capability of a terminal device to maintain the acoustic properties of sound while the distance between the speaker or receiver (e.g. transducer) of the terminal device and the ear is growing.

BACKGROUND OF THE INVENTION

In order that the user of a terminal device would hear a sound as optimal as possible as regards its strength and quality, the speaker of the device must usually be held against the ear as close as possible. In other words, normally the user experiences that he or she hears the best sound in respect of quality when the terminal is pressed tightly against the ear, in which case a kind of an acoustic, sealed space is created between the mobile station and the ear.

If the speaker is not pressed against the ear, a gap is created between the ear and the speaker via which the acoustic waves are leaking to the side. The more far off the speaker is kept from the user's ear, the bigger part of the acoustic waves generated by the speaker passes the ear. The sound pressure and sound volume sensed by the user is thus the smaller the bigger is the distance (in other words leakage) between the speaker and the ear.

In case the leakage is strong, the user will perceive changes in the quality of the sound reaching his or her ear, since low frequencies tend to weaken more than high frequencies. In this connection, the term leakage tolerance is introduced, which means the capability of the terminal device to maintain the aforementioned acoustic properties of sound, when the distance between the speaker and the ear changes and the aforementioned acoustic space changes as well.

The problem referred to above can be encountered especially in mobile stations and corresponding terminal devices, since the aforementioned devices are typically not pressed, and they cannot necessarily be pressed, tight against the ear. The improving of the leakage tolerance especially in small devices is problematic, since the devices typically have little space in order that the solutions improving the leakage tolerance could be easily introduced. When the terminal devices are getting smaller and smaller in respect of their physical size, there is less and less space left in the device structure for different solutions improving the leakage tolerance.

The size of the acoustic structure space that is possibly left inside the device structure affects the amount of the so-called acoustic impedance of the device. It would be preferable to get the acoustic impedance, i.e. acoustic output impedance of the speaker, as small as possible. When the aforementioned output impedance is small, the distance of the device or speaker from the ear does not have such a big effect on the quality of sound sensed by the user.

The objective of the invention is to overcome the aforementioned disadvantage and to disclose a solution which enables one to achieve a leakage tolerance better than before for the mobile station and the like devices.

SUMMARY OF THE PRESENT INVENTION

The objective of the invention is to improve the acoustic properties of terminal devices such as mobile stations by achieving a leakage tolerance as good as possible for them, i.e. a capability to maintain the sound quality good, although the properties of the acoustic space between the speaker and the ear change while the distance between them changes. The present invention provides a method for improving acoustic properties of a terminal device of a telecommunication network and a terminal device of a telecommunication network.

According to a first aspect of the present invention there is provided a method for improving acoustic properties of a terminal device of a telecommunication network, which terminal device comprises an enclosure and a speaker located in the enclosure for generating acoustic waves, in which method the acoustic waves generated forwards by the speaker are conveyed substantially directly out of the enclosure, so that to improve the leakage tolerance of the terminal device, at least part of the acoustic waves generated backwards by the speaker are conveyed inside the enclosure to a separate cavity-like space generated by the antenna space of the terminal device.

Preferably, the terminal device comprises a circuit board between the speaker and the antenna space, characterised in that the acoustic waves generated backwards by the speaker are conveyed to the antenna space via at least one hole made in the circuit board.

Preferably, the terminal device comprises a circuit board between the speaker and the antenna space, characterised in that the acoustic waves generated backwards by the speaker are conveyed to the antenna space via a slot formed in the edge of the circuit board. Preferably, from the cavity space, the acoustic waves are conveyed further out of the enclosure.

According to a second aspect of the present invention there is provided a terminal device of a telecommunication network comprising an enclosure and a speaker in the enclosure for generating a sound for the user of the terminal device, in which enclosure there is a cavity-like antenna space formed for the antenna of the terminal device, so that the terminal device further comprises means for conveying the acoustic waves generated backwards by the speaker in the enclosure to the aforementioned antenna space.

Preferably, the terminal device comprises a speaker and a circuit board between the speaker and the antenna space, characterised in that the aforementioned means comprise a hole in the circuit board for conveying the acoustic waves from the rear part of the speaker to the antenna space via the hole.

Preferably, the terminal device comprises a circuit board between the speaker and the antenna space, characterised in that the aforementioned means comprise a slot in the edge of the circuit board for conveying the acoustic waves from the rear part of the speaker to the antenna space via the slot.

Preferably, the antenna space is for the internal antenna of the terminal device. Alternatively, the antenna space is for the external antenna of the terminal device.

Preferably, the antenna space is cavity-like as concerns its structure and comprises at least one wall that can be opened. More preferably, the antenna space is not radio-shielded.

Preferably, the terminal device further comprises means for conveying the acoustic waves from the antenna space outside the enclosure. More preferably, the means for conveying the acoustic waves from the antenna space outside the enclosure are arranged to convey the acoustic waves substantially towards the direction into which the speaker generates acoustic waves proceeding forwards.

The invention is based on the idea that the leakage tolerance is influenced also by the waves generated backwards by the transducer (oscillator). The idea of the invention is to improve the leakage tolerance by using the cavity-like space inside the terminal device, intended for the device antenna, as the space receiving these backward waves, in which case there is a route arranged from the rear part of the speaker to the antenna space. Due to the improving of the leakage tolerance, the user can change the distance of the terminal device from the ear without the user feeling that the sound quality would significantly change. The importance of the improving of the leakage tolerance is emphasised in devices that cannot be pressed tight against the ear and in environments with a relatively strong background noise.

The additional advantage of the use of the antenna space in the rear part of the mobile station is in that the cavity-like antenna space is typically already there in the terminal device. In other words, the utilisation of the antenna space for the purpose in accordance with the invention keeps the physical size of the device as it is, which might be difficult, if the space in question had to be implemented specifically for this purpose. Since the antenna space is already there in the terminal device, the implementation of the space does not add to the design and manufacture costs of the terminal device either.

Since the antenna space is relatively big as concerns its volume, it enables one to efficiently improve the leakage tolerance and also the other acoustical properties of the device. The antenna space is located substantially usually always in the same place in the device as the speaker, but on the opposite side of the device, which makes it easy to implement the conveying of the acoustic waves being directed backwards from the speaker to the antenna space. The antenna space usually consists of a space which is outlined by walls, which are typically made e.g. of plastic, in which case the route to the antenna space can be formed e.g. by means of the apertures in the walls.

BRIEF DESCRIPTION OF THE DRAWINGS

For a better understanding of the present invention and in order to show how the same may be carried into effect reference will now be made to the accompanying drawings, in which.

DETAILED DESCRIPTION OF CERTAIN EMBODIMENTS

Figure 1:
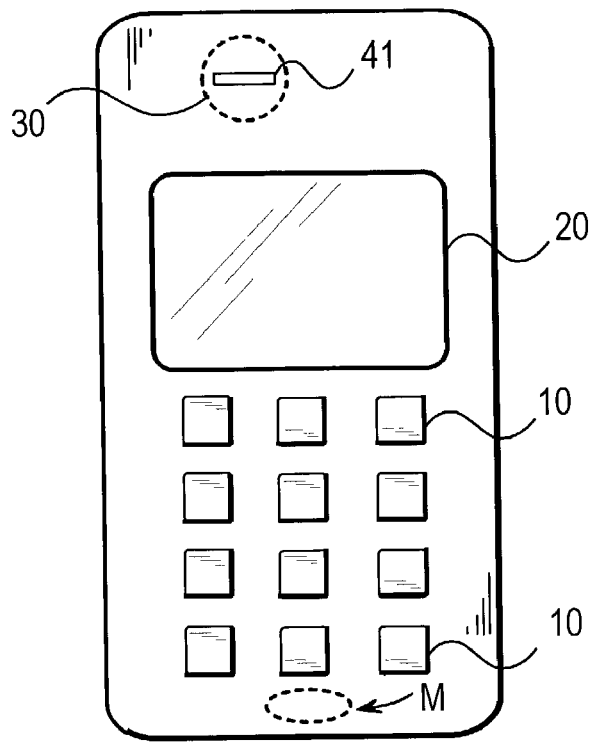
FIG. 1 represents a subscriber terminal device of the invention as seen from the front.

FIG. 1 represents the subscriber terminal device of the invention as seen from the front. As can be seen in the figure, the subscriber terminal device comprises keys 10, a display 20 and a speaker 30, which converts an electronic signal into an acoustic sound. In the implementation mode of FIG. 1, the speaker is located in the upper part of the device above the display. Correspondingly, the microphone M is typically located in the lower part of the device below the keyboard. This is a common implementation mode e.g. in mobile stations. When the user of a terminal device such as this is in a speech connection, he or she can hear the audio signal generated by the speaker of the subscriber terminal device the better the closer he or she keeps the speaker to his or her ear.

Figure 2:
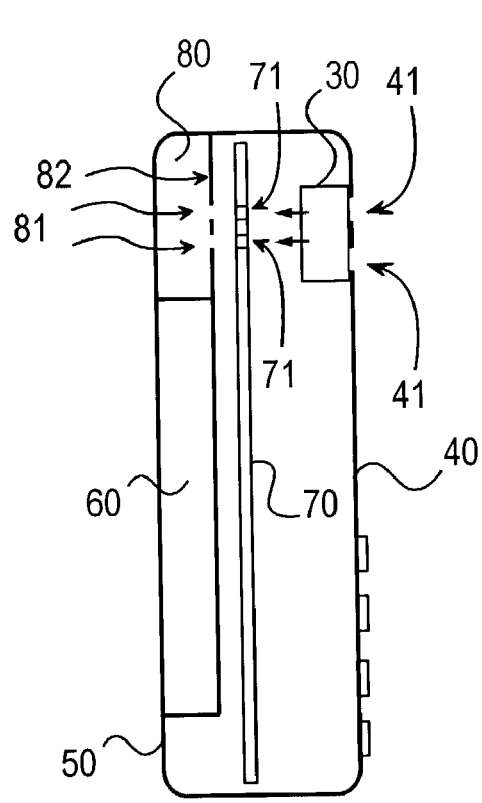
FIG. 2 illustrates one implementation mode of the subscriber terminal device as seen from the side.

FIG. 2 illustrates one implementation mode of the terminal device as seen simplified from the side. The terminal device comprises a speaker 30, front part 40 of the cover and at least one hole 41 in it that is near the speaker, a rear part 50 of the cover, a space 60 for the accumulator, a circuit board 70 inside the device and an antenna space 80 for the antenna of the terminal device, which antenna space is in the elevation of the device substantially near the speaker, but on the opposite side of the circuit board with respect to the speaker. According to the invention, in the circuit board there is at least one hole 71, and in the wall of the antenna space at least one hole 81 for conveying the acoustic waves generated backwards by the speaker to the antenna space.

The hole or holes 81 are in the wall 82 of the antenna space 80 that is nearest to the circuit board. In practice, the surface of the aforementioned wall is parallel to the surface of the circuit board. As can be seen in FIG. 2, there are several holes 41 in the front cover that are near the speaker. In that case, the acoustic waves generated by the speaker can proceed via the holes 41 directly to the ear of the user. The number of holes in the front cover is of no importance from the point of view of the invention, although the number and size of the holes do have an effect e.g. on the acoustic pressure and thereby on the sound quality.

The antenna space 80 has been placed in the upper part of the rear part of the device. The device presented in FIG. 2 comprises an antenna space for a so-called internal antenna (not presented in the figure). The antenna space and the speaker are located preferably at the same level and in the same place of the device in the horizontal plane, in which case the backward wave generated by the speaker has got a route as short as possible to the antenna space.

Figure 7:
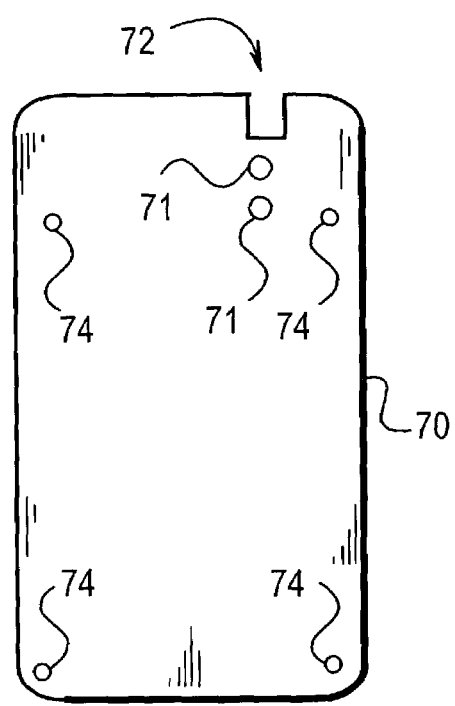
FIG. 7 represents a circuit board of the subscriber terminal device.

In between the antenna space and the speaker there is a circuit board 70 comprising holes 71 (see FIG. 7). The holes 71 are on the circuit board so that while the circuit board is installed the holes 71 are between the speaker and the antenna space. In other words, the holes 71 and holes 81 are preferably opposite each other so that via them, a direct connection is established from the rear part of the speaker to the antenna space.

Figure 3:
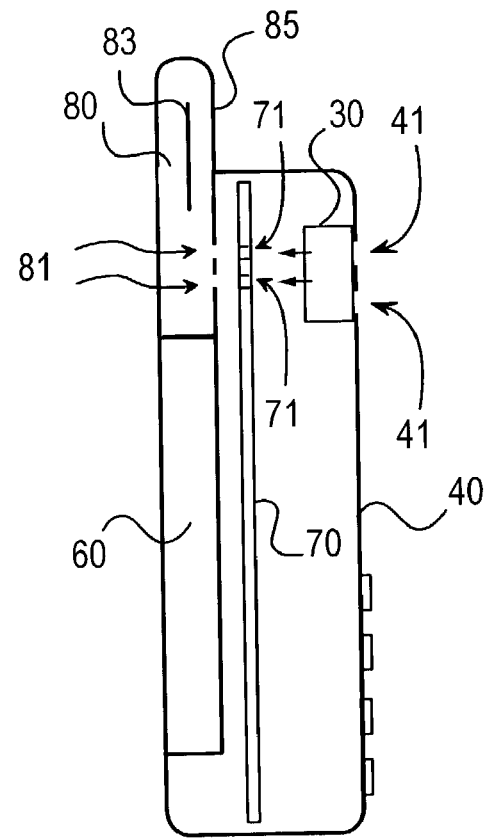
FIG. 3 illustrates another implementation mode of the subscriber terminal device as seen from the side.

FIG. 3 represents another terminal device as seen simplified from the side. The terminal device comprises in this case an antenna space 80 for a so-called external antenna 83 of the device. As can be seen in FIG. 3, the external antenna requires a protruding part 85 being directed away from the cover of the device. Also in this case, the acoustic waves generated backwards by the speaker are conveyed to the antenna space via one or more holes 71 in the circuit board and via one or more holes 81 in the wall of the antenna space.

In the following, the acoustic functioning of the device will be described in more detail with reference to FIGS. 2 and 3. The speaker (oscillator) generates, in a manner known in itself, anti-phase waves forwards and backwards. The waves proceeding forwards pass through the holes 41 out of the device, after which most of the acoustic waves proceeds to the ear of the user the more apparently the closer to his or her ear the user keeps the speaker. Since the adjustment of the device and speaker to the ear is not always optimal, there is always some kind of space or gap created in between the device and the ear, from which the acoustic waves are proceeding so that they do not reach the ear. The solution in accordance with the invention enables one to improve the leakage tolerance to such a degree that the user does not necessarily notice any changes in the sound quality, although he or she would move the terminal device relatively far off from his or her ear.

To improve the leakage tolerance, there is a route arranged for the acoustic waves proceeding backwards in a separate acoustic space, which is preferably an antenna space 80 already existing in the device, as presented in FIGS. 2 and 3. The route is achieved by holes 71 made in the circuit board and holes 81 made in the walls of the antenna space 80, in which case a direct connection is established from the rear part of the speaker to the antenna space 80 functioning as an acoustic space.

In the circuit board there are typically different through-holes for leading the signal routes to different parts of the circuit board. The backward waves can be directed via these kind of through-holes to the antenna space, in which case there is no need to make separate holes for the acoustic waves.

When the antenna space is used as an acoustic space as presented above, the acoustic output impedance of the speaker can be reduced, in which case the leakage tolerance of the device gets better. The leakage tolerance gets significantly better, since the antenna space behind the speaker is a relatively big cavity-like space. The space is functioning as some kind of Helmholz resonator, which is in connection to the rest of the space via the apertures. At the same time, the space is functioning as a kind of an acoustic load, in which case the variations in the overall load of the speaker can be compensated.

Figure 4:
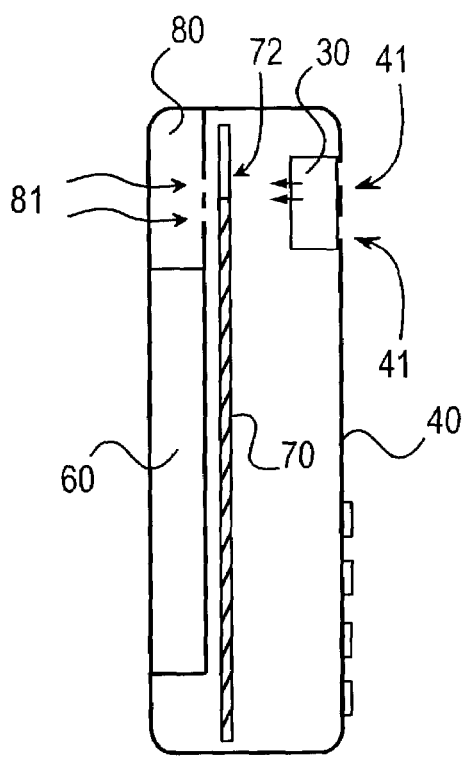
FIG. 4 illustrates an implementation mode in which the sound is conveyed to the antenna space via a slot in the edge of the circuit board.

FIG. 4 illustrates an implementation mode in which the circuit board 70 comprises a slot 72 (see FIG. 7) in the upper part via which the backward wave is directed to the antenna space. It is preferable that the cavity is located in the same place of the device as the speaker, in which case the backward wave may proceed directly towards the slot 72. The backward wave is directed to the antenna space via the slot 72 and one or more holes 81 in the wall of the antenna space.

Figure 5:
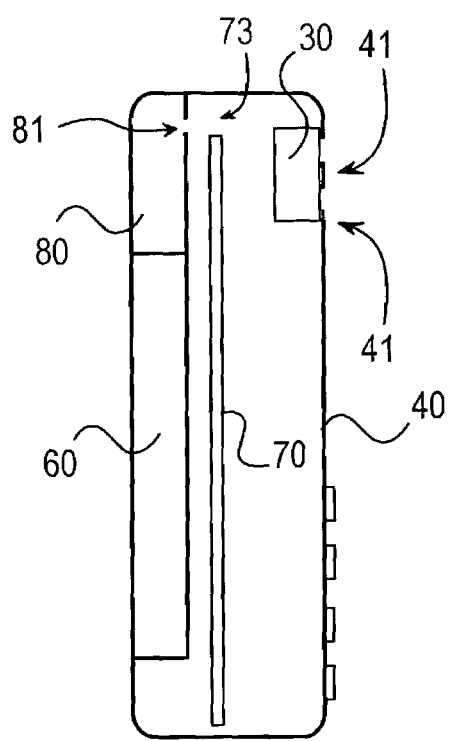
FIG. 5 illustrates an implementation mode in which the sound is conveyed to the antenna space from between the edge of the circuit board and the device enclosure.

FIG. 5 illustrates an implementation mode in which the sound is directed to the antenna space from a gap between the upper part of the circuit board and the device enclosure. As can be seen in FIG. 5, there is a gap left in between the upper part of the circuit board and the device enclosure. The backward wave is conveyed to the antenna space via this gap 73 and one or more holes 81 in the wall of the antenna space.

In the solution of the invention, the device thus comprises a channel is formed for the backward waves of the oscillator that directs the backward waves to the cavity or air space generated by the antenna space, in which case a bottle-like structure is created.

Figure 6:
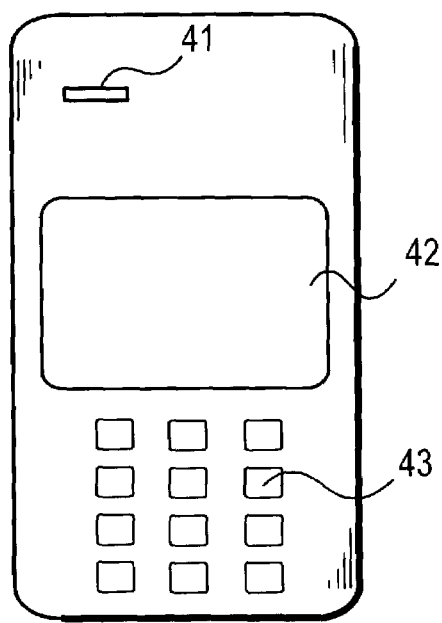
FIG. 6 represents the front part of the cover of the subscriber terminal device.

FIG. 6 represents the front part 40 of the cover of the terminal device as seen from the front. The front part comprises at least one aperture for directing the sound generated by the speaker out of the device, an aperture 42 for the display and apertures 43 for the keys of the keyboard.

FIG. 7 represents in more detail the circuit board 70 of the terminal device. On the circuit board there are electronic components of the device, which are, however, not separately shown in the figure. For the acoustic structure of the invention, the circuit board comprises preferably one or more slots 72 or holes 71, via which the acoustic waves proceeding backwards are conveyed to the antenna space. The circuit board usually comprises also other holes 74 through which the screws or similar fastening means are lead for attaching the circuit board to the device structure.

Figure 8:
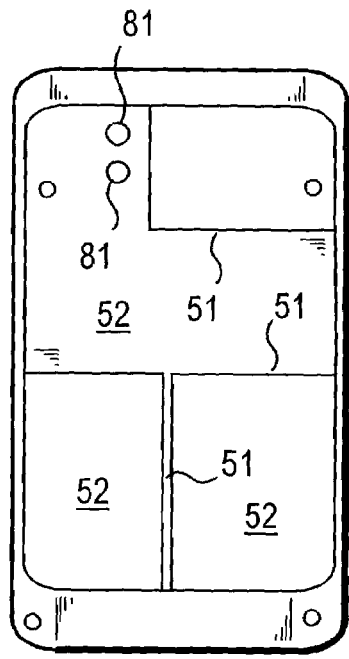
FIG. 8 represents the rear part of the cover of the terminal device as seen from the inner surface.

FIG. 8 represents the rear part of the cover as seen from the inner surface. The rear part 50 comprises walls 51 on the inner surface that form areas 52 for different operational components of the device. In other words, the components on the surface of the circuit board are closed block by block into the shelter of the walls. The inner surface of the rear cover that comes against the circuit board may be coated with a metal layer for preventing the proceeding of interference signals and radio-frequency signals to such device structures in which they can cause interference.

Also the walls have been coated with a metal layer. The holes 81 in the rear part of the cover punch the metal layer in the rear part. In this implementation mode, the inner surface of the rear part of the cover coated with a metal is the outer surface of one wall of the antenna space. The antenna space is, however, not radio-shielded, since the antenna space is not surrounded with an electrically conductive material. In practice, the antenna space cannot even be radio-shielded, since the antenna has to be able to send and receive radio signal.

Figure 9:
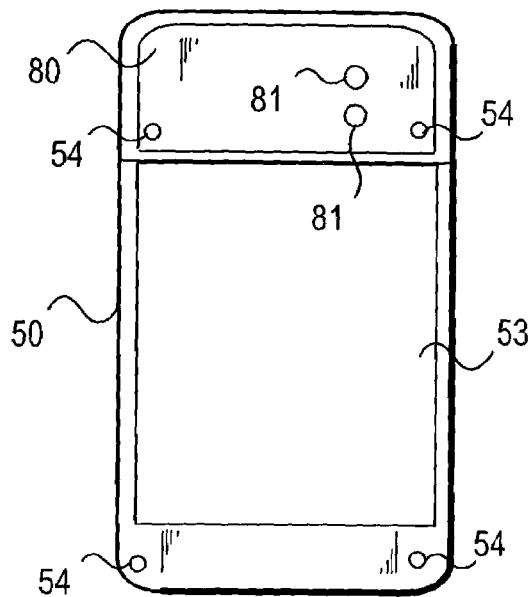
FIG. 9 represents the rear part of the cover of the terminal device as seen from the outer surface.

FIG. 9 shows the rear part of the cover as seen from the outer surface. The rear part comprises an area 53 for the accumulator. In addition, the rear part of the cover comprises the aforementioned antenna space 80 in whose wall that is against the circuit board there are holes 81. In this implementation mode both the antenna space and the accumulator space are closed with their own covers. The cover is, however, not presented in this connection. The rear part of the cover comprises, in addition, holes 54 via which the rear part is attached to the front part of the cover.

Figure 10:
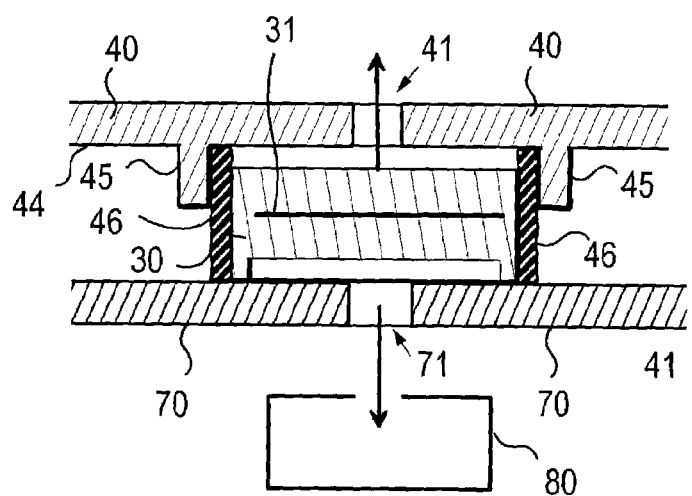
FIG. 10 is a cross-sectional view of the device near the speaker.

FIG. 10 is a cross-sectional view showing, in more detail, the structure of the terminal device near the speaker. As can be seen in the figure, the speaker of the terminal device is between the front part of the cover and the circuit board. The front part of the cover comprises a protruding part 45 on the inner surface of the cover that is against the circuit board. The protruding part, the inner surface 44 of the front part of the cover and the circuit board 70 form an enclosure-like structure for the speaker 30.

In the structure of the invention, the speaker 30 is open in its front and rear part so that the waves generated by the oscillator can proceed both forwards and backwards. The oscillator of the speaker consists of a film 31, whose front and rear part generate anti-phase acoustic waves. The backward wave proceeding towards the circuit board is conveyed to a cavity-like space, which is preferably comprised of an antenna space 80. In the implementation mode of FIG. 10, the acoustic waves are conveyed to the antenna space via a hole 71 in the circuit board.

As can be seen in FIG. 10, the terminal device comprises a gasket 46 between the protruding part 45 and the speaker 30. The gasket is preferably ring-like as concerns its shape and is placed against the side of the speaker. The gasket enables one to acoustically isolate the front part of the speaker from the rear part of the speaker in order that the acoustic waves generated by the film surface in the front part of the speaker cannot proceed to the rear part of the speaker and vice versa. The gasket is made e.g. of a rubber mixture or a corresponding material, in which case the gasket fills the possible gaps on the side of the speaker so that the acoustic waves cannot proceed that way from one side to another. In another implementation mode, there is gasket only in the upper and lower part of the speaker.

The speaker of the terminal device functions in principle in the same way as a loudspeaker. The oscillating film in the speaker thus generates an acoustic sound pressure. There are different speakers as concerns their operating principle, such as dynamic, iso and orthodynamic, electrostatic, speakers based on the capacitance and piezoelectricity. From the point of view of the invention it is, however, not substantial what type of oscillator is used to generate the sound. Substantial is only the fact that the oscillator generates, with respect to a wave proceeding forwards, an anti-phase backward wave that is not muffled, in which case it can be conveyed, according to the invention, to a cavity-like space in the device, preferably to the antenna space.

Figure 11:
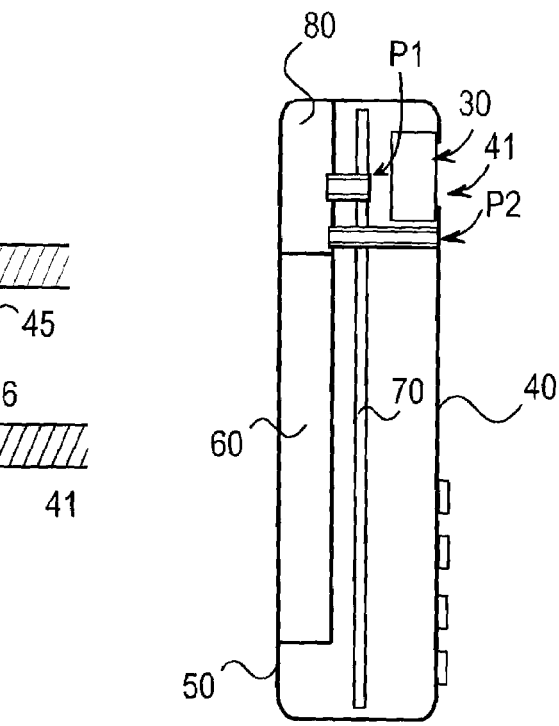
FIG. 11 illustrates one alternative implementation mode of the subscriber terminal device.

A channel from the rear part of the speaker to the cavity or antenna space can be formed also e.g. by a separate pipe, as shown in FIG. 11. In that case, the backward wave can be efficiently connected to the space in question. To further improve the leakage tolerance, the terminal device also comprises a separate return channel for the acoustic waves that arrive from the speaker to the antenna space. Via the return channel, the acoustic waves are conveyed from the antenna space via apertures in the front part of the cover out of the device structure. In FIG. 11, the return channel has been implemented by a separate pipe (P2). In the implementation modes of FIGS. 1–10, there is not a separate return channel; instead in these a very small gap or space is left in between the cover structures of the device via which the sound waves escape from the cavity space.

Although the invention has been described above with reference to the examples in accordance with the accompanying drawings, it is obvious that the invention is not restricted to them; instead it can be varied in the scope of the inventive idea defined by the accompanying claims.

The invention claimed is:

1. A method for improving acoustic properties of a terminal device of a telecommunication network, which terminal device comprises an enclosure and a speaker located in the enclosure for generating acoustic waves, in which method the acoustic waves generated forwards by the speaker are conveyed substantially directly out of the enclosure, wherein to improve the leakage tolerance of the terminal device, at least part of the acoustic waves generated backwards by the speaker are conveyed inside the enclosure to a separate cavity space generated by an antenna space of the terminal device, and wherein the acoustic waves are conveyed further out of the enclosure from the cavity space.

2. The method according to claim 1, wherein the terminal device comprises a circuit board between the speaker and the antenna space, and wherein the acoustic waves generated backwards by the speaker are conveyed to the antenna space via at least one hole made in the circuit board.

3. The method according to claim 1, wherein the terminal device comprises a circuit board between the speaker and the antenna space, and wherein the acoustic waves generated backwards by the speaker are conveyed to the antenna space via a slot formed in the edge of the circuit board.

4. A terminal device of a telecommunication network comprising an enclosure, a second means, and a speaker in the enclosure for generating a sound for a user of the terminal device, in which enclosure there is a an antenna space formed for an antenna of the terminal device, wherein the terminal device further comprises a first means for conveying acoustic waves generated backwards by the speaker in the enclosure to the antenna space, and wherein the second means conveys the acoustic waves from the antenna space to the outside of the enclosure.

5. The terminal device according to claim 4, the terminal device further comprising a speaker and a circuit board between the speaker and the antenna space, wherein the first means comprises a hole in the circuit board for conveying the acoustic waves from a rear part of the speaker to the antenna space via the hole.

6. The terminal device according to claim 4, the terminal device further comprising a circuit board between the speaker and the antenna space, wherein the first means comprises a slot in the edge of the circuit board for conveying the acoustic waves from a rear part of the speaker to the antenna space via the slot.

7. The terminal device according to claim 4, wherein the antenna space is for an internal antenna of the terminal device.

8. The terminal device according to claim 4, wherein the antenna space is for an external antenna of the terminal device.

9. The terminal device according to claim 4, wherein the antenna space is a cavity and comprises at least one wall that can be opened.

10. The terminal device according to claim 4, wherein the antenna space is free from radio shielding.

11. The terminal device according to claim 4, wherein the second means for conveying the acoustic waves from the antenna space outside the enclosure are arranged to convey the acoustic waves substantially towards a direction into which the speaker generates acoustic waves proceeding forwards.

* * * * *